May 17, 1966   T. A. O'DONNELL   3,251,644
REDUCTION OF URANIUM HEXAFLUORIDE TO URANIUM TETRAFLUORIDE
Filed Aug. 8, 1963
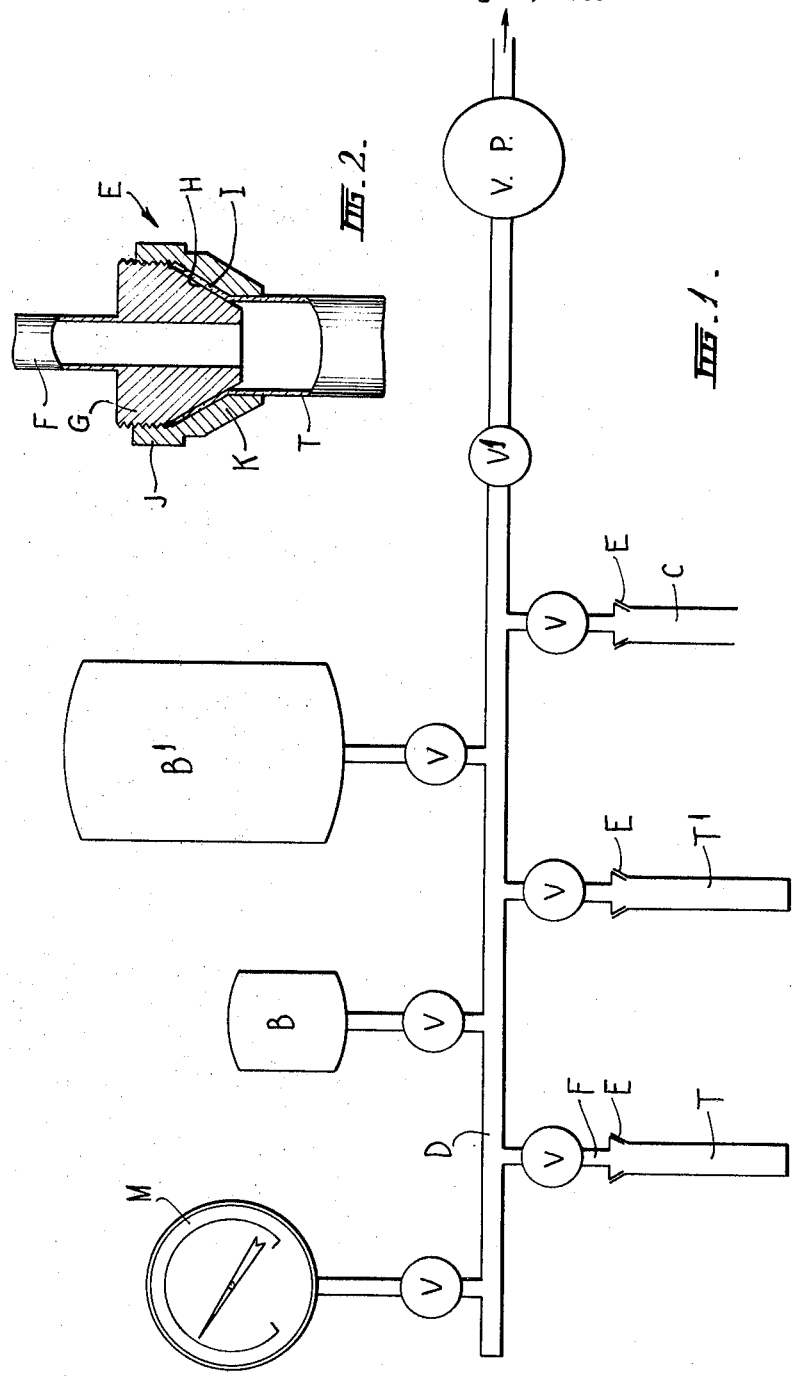

United States Patent Office 3,251,644
Patented May 17, 1966

3,251,644
REDUCTION OF URANIUM HEXAFLUORIDE TO URANIUM TETRAFLUORIDE
Thomas Aloysius O'Donnell, Burwood, Victoria, Australia, assignor to The University of Melbourne, a corporation of Victoria, Australia
Filed Aug. 8, 1963, Ser. No. 300,785
Claims priority, application Australia, Aug. 17, 1962, 21,128/62
14 Claims. (Cl. 23—14.5)

This invention relates to a method for reducing uranium hexafluoride to uranium tetrafluoride.

The invention broadly resides in effecting this reduction by using as the reducing agent phosphorus trifluoride or a mixture of phosphorus trifluoride and hydrogen fluoride. The reduction process occurs at room temperatures (as well as at higher temperatures as hereinafter described) and in this respect differs markedly and in an improved manner from reported reduction processes.

Uranium occurs in its ores as an isotopic mixture of uranium 235 and uranium 238. Uranium metal, enriched in uranium 235, is required for certain nuclear energy processes; and the necessary enrichment is normally achieved by passing volatile uranium hexafluoride, prepared from natural uranium, through porous membranes in a gaseous diffusion process, the lighter uranium 235 hexafluoride diffusing more rapidly than uranium 238 hexafluoride. The isotopically enriched uranium hexafluoride, which is volatile and highly reactive, is then reduced to the relatively inert uranium tetrafluoride, which in turn is reduced to metallic uranium. In reported accounts of current practice, the reduction of uranium hexafluoride to the tetrafluoride is effected by the use of a reducing agent such as hydrogen or trichlorethylene. In these reported processes, the reduction is of necessity carried out at elevated temperatures and it is found that corrosion of equipment introduces difficulties. Also hydrogen, which is very frequently used, introduces the hazards of explosion.

In the reduction process of the present invention, uranium hexafluoride is reduced by means of phosphorus trifluoride. The reaction may be represented by the chemical equation:

$$UF_6 + PF_3 \rightarrow UF_4 + PF_5$$

Experiments carried out in apparatus constructed of materials similar to those used industrially have shown that reduction to the tetrafluoride occurs; but if, depending on the experimental conditions (for example, if the supply of phosphorus trifluoride is insufficient), reduction occurs to a uranium fluoride intermediate between the hexafluoride and the tetrafluoride, i.e., to $UF_5$, $U_4F_9$ or $U_4F_{17}$, heating of the intermediate uranium fluoride in the presence or absence of the phosphorus trifluoride causes disproportionation of the intermediate uranium fluoride. The intermediate fluoride decomposes to the desired uranium tetrafluoride and the volatile uranium hexafluoride. Temperatures of 100° C. to 300° C. may be used for disproportionation of the intermediate fluorides. The uranium hexafluoride formed may be recycled through the apparatus and reduced by phosphorus trifluoride.

Another of the practical advantages of the present process is that uranium hexafluoride reacts in the gaseous phase with phosphorus trifluoride. Phosphorus pentafluoride, produced in the reaction, is also gaseous. However, uranium tetrafluoride and uranium fluorides intermediate between the hexafluoride and the tetrafluoride, are involatile and can be separated easily from the reaction mixture.

The reducing agent, phosphorus trifluoride, is non-explosive and relatively inert. It can be separated from phosphorus pentafluoride, produced in the reaction, because the pentafluoride reacts vigorously with water to form phosphoric acid and hydrofluoric acid, whereas the trifluoride does not react readily with water.

The reaction can be effected at room temperature, e.g., at temperatures below 35° C., if so desired. If higher temperatures are employed, the reaction proceeds more actively, but the risk of corrosion of equipment is increased. The maximum temperature at which the process can be carried out without serious corrosion occurring depends on the nature of the equipment used, but with normal equipment temperatures up to 150° C. can be employed without serious risk of corrosion, and higher temperatures may be used if some degree of corrosion can be tolerated.

Although, as previously stated, the reaction proceeds at room temperatures, it may be desired in practice to carry out the reaction at higher temperatures (for example, 50° to 100° C.) in order to increase the speed of the reaction and to increase the amount of uranium hexafluoride which is present in the vapour state.

The proportion of phosphorus trifluoride to uranium hexafluoride employed is preferably in excess of the stoichiometric quantity required to effect complete reduction of the uranium hexafluoride to uranium tetrafluoride, i.e., the molar proportions of phosphorus trifluoride to uranium hexafluoride are in excess of 1:1.

It has also been found that mixtures of phosphorus trifluoride and hydrogen fluoride are also very efficient in reducing uranium hexafluoride to uranium tetrafluoride. The presence of hydrogen fluoride is found to increase the speed of the reaction, but also increases the risk of corrosion. The molar proportions of hydrogen fluoride to phosphorus trifluoride may be, for example, between 1:1 and 1:20.

Examples of the process of this invention are as follows:

*Example 1*

Uranium hexafluoride and phosphorus trifluoride were introduced into a previously evacuated glass reaction system. The two colourless compounds were distilled into a glass trap cooled by liquid nitrogen. Soon after the removal of the coolant, the mixture began to turn brown and green, indicating the commencement of reaction and the formation of uranium tetrafluoride and of intermediate fluorides. When the glass trap was heated, firstly to 200° C. and then to 350° C., the solid material turned dark green, indicating the formation of $UF_4$, with some white colouration indicative of glass attack by the hot fluorides. After the trap was opened the solid residue contained in it was treated with a solution of sodium hydroxide. All solids except the green crystalline insoluble uranium tetrafluoride dissolved, and the uranium tetrafluoride was separated and identified by its colour and by chemical analysis.

*Example 2*

A metal vacuum system was constructed to enable the reduction reaction to be carried out under conditions similar to those used industrially and in the absence of glass, which itself can react with certain of the fluorides involved. The apparatus is shown diagrammatically in FIGURE 1 of the accompanying drawings. All-metal vacuum valves (No. 434, manufactured by Hoke Inc., U.S.A.), lettered V, are brazed directly to a tubular nickel manifold D. The manifold D is connected through valve $V^1$ to a vacuum pump VP. Other components are an all-metal bourdon tube manometer M, two nickel bulbs B and $B^1$ each of known volume (the volume of bulb $B^1$ being considerably greater than that of bulb B), a connection C for admitting phosphorus trifluoride from a suitable source of supply, and two traps T and T¹, all of which are connected to the manifold D through the valves V. Each of the traps T and T¹ is of substantially smaller volume than that of the smaller bulb B. These traps T and T¹, each connected by a vacuum-tight flare fitting at E, are the only units in the reaction system which are non-metallic, being moulded from the material marketed under the trade name Kel-F (polychlorotrifluoroethylene). This material is chemically inert and cannot affect the course of the reaction. It is transparent and allows observation of the course and products of the reaction.

The flare fitting E is shown in detail in FIGURE 2 of the drawings. An externally threaded flare member G is brazed or otherwise secured to the end of the tube F and is formed with a conical face H. A ferrule J is internally threaded and is screwed to the flare member G. The end portion I of the trap T (or the trap T¹ or connection C) is flared outwardly and is clamped between the conical face H of the flare member G and the inner face of the conical portion K of the ferrule J.

Before carrying out the reaction, the vacuum pump VP is started up and valve V¹ and all valves V are opened. Evacuation is continued until the residual pressure in the entire system is approximately $10^{-1}$ to $10^{-2}$ mm. Hg. This procedure removes air and the atmospheric water vapour from the system. Removal of the water vapour avoids reaction between vapour and certain of the reactants in and products of the process. Removal of air from the system has the advantage that the volatile substances can be distilled and condensed more readily from one part of the reaction system to another.

A small amount of uranium hexafluoride (about 0.5 g.), purified by distillation, was distilled into the trap T. Phosphorus trifluoride introduced through connection C was added quantitatively to the reaction system by admitting it at known pressure and room temperature to the nickel bulb B of known volume, and then condensing this gas from bulb B into the trap T¹.

With traps T and T¹ at room temperature, their valves V were opened (the other valves being closed) and phosphorus trifluoride was transferred from trap T¹ to the trap T. From the previously determined volumes of traps T and T¹ and of the manifold D and bulb B, the partial pressure and therefore the quantity of phosphorus trifluoride in trap T could be calculated. The molar proportions of phosphorus trifluoride to uranium hexafluoride were in excess of 1:1. Reaction between the uranium hexafluoride and phosphorus trifluoride occurred in trap T at room temperature (about 15° C.) and complete conversion to uranium tetrafluoride resulted. The uranium tetrafluoride was identified by its green colour and its conversion to an insoluble blue-green hydrate in water. The hydrate could be brought into aqueous solution by addition of a ceric compound. An X-ray powder pattern was used as final confirmation of the identity of the green solid as uranium tetrafluoride.

*Example 3*

The apparatus described in Example 2 was used to effect the reduction of uranium hexafluoride by a mixture of phosphorus trifluoride and hydrogen fluoride. The molar proportions of hydrogen fluoride to phosphorus trifluoride were 1:1 and the molar proportions of phosphorus trifluoride and hydrogen fluoride to the uranium hexafluoride were in excess of 1:1. This reaction produced uranium tetrafluoride much more rapidly than the reaction described in Example 2. The uranium tetrafluoride was identified in the same manner as in Example 2.

*Example 4*

Uranium hexafluoride was reduced by a mixture of phosphorus trifluoride and hydrogen fluoride in the molar proportions of 20:1 under the same conditions as in Example 2. Uranium tetrafluoride was produced, the rate of reaction being greater than in Example 2 but less than in Example 3.

I claim:
1. A process for the reduction of uranium hexafluoride to uranium tetrafluoride, which comprises substantially removing water vapor from a system, and reacting the uranium hexafluoride with phosphorus trifluoride in the said system.
2. A process according to claim 1 wherein the reduction is carried out in the gaseous phase.
3. A process according to claim 1 wherein the molar proportions of phosphorus trifluoride to uranium hexafluoride are in excess of 1:1.
4. A process according to claim 1 wherein the reduction is carried out at a temperature below 150° C.
5. A process according to claim 1 wherein the reduction is carried out at a temperature below 35° C.
6. A process according to claim 1 wherein an intermediate uranium fluoride is formed during the course of the reaction and is then decomposed by heating to form uranium tetrafluoride.
7. A process according to claim 6 wherein the intermediate fluoride is heated at a temperature between 100° C. and 300° C.
8. A process for the reduction of uranium hexafluoride to uranium tetrafluoride, which comprises evacuating a system to substantially remove water vapor therefrom, reacting the uranium hexafluoride with phosphorus trifluoride in the said system at a temperature below 150° C. to form a uranium fluoride intermediate between uranium hexafluoride and uranium tetrafluoride, and heating the intermediate uranium fluoride so as to form uranium tetrafluoride.
9. A process according to claim 8 wherein the reduction of uranium hexafluoride to the intermediate fluoride is carried out in the gaseous phase.
10. A process for the reduction of uranium hexafluoride to uranium tetrafluoride, which comprises evacuating a system to substantially remove water vapor therefrom and reacting the uranium hexafluoride in the said system with a mixture of phosphorus trifluoride and hydrogen fluoride.
11. A process according to claim 10 wherein the reaction is carried out in the gaseous phase at a temperature below 150° C.
12. A process for the reduction of uranium hexafluoride to uranium tetrafluoride, which comprises evacuating a system to substantially remove water vapor therefrom reacting the uranium hexafluoride in the said system with a mixture of phosphorus trifluoride and hydrogen fluoride to form a uranium fluoride intermediate between uranium hexafluoride and uranium tetrafluoride, and heating the intermediate uranium fluoride to form uranium tetrafluoride.
13. A process according to claim 12 wherein the reduction of uranium hexafluoride to the intermediate fluoride is carried out in the gaseous phase at a temperature below 150° C.
14. A process according to claim 10 wherein the molar proportions of hydrogen fluoride to phosphorus trifluoride are between 1:1 and 1:20.

References Cited by the Examiner

UNITED STATES PATENTS

| | | | |
|---|---|---|---|
| 2,638,406 | 5/1953 | Tevebaugh et al. | 23—14.5 X |
| 2,932,554 | 4/1960 | Collins et al. | 23—14.5 X |

LEON D. ROSDOL, *Primary Examiner.*

CARL D. QUARFORTH, *Examiner.*

M. J. SCOLNICK, *Assistant Examiner.*